United States Patent

Thompson

[11] Patent Number: 5,109,941
[45] Date of Patent: May 5, 1992

[54] TRACTION ENHANCEMENT SYSTEM

[76] Inventor: Herb Thompson, 127 N. Devon, East Wenatchee, Wash. 98801

[21] Appl. No.: 572,169

[22] Filed: Aug. 23, 1990

[51] Int. Cl.⁵ .......................................... B62M 27/02
[52] U.S. Cl. .................... 180/182; 280/28; 280/809; 280/900
[58] Field of Search ............... 180/182, 183, 184, 190, 180/191, 192, 193, 123; 280/15, 845, 28, 28.16, 609, 900, 809; 293/102-105, 129, 131; 37/221, 223, 224, 263; 36/122, 123, 124, 125

[56] References Cited

U.S. PATENT DOCUMENTS

| | | | |
|---|---|---|---|
| 1,470,087 | 10/1923 | Lesher | 180/182 |
| 1,473,956 | 11/1923 | Eyre et al. | 293/105 |
| 2,722,064 | 11/1955 | Jaffe | 37/263 |
| 3,560,013 | 2/1971 | Lee | 280/494 |
| 3,719,369 | 3/1973 | Savage | 180/182 |
| 3,720,421 | 3/1973 | Clemmer | 180/182 |
| 3,779,325 | 12/1973 | Liuhanen | 36/122 |
| 3,884,498 | 5/1975 | Cote | 37/219 |
| 4,025,081 | 5/1977 | Bintz | 180/183 |
| 4,057,916 | 11/1977 | Roemer | 37/223 |
| 4,127,949 | 12/1978 | Sabrowsky et al. | 37/221 |
| 4,180,275 | 12/1979 | Montoya | 280/28 |
| 4,861,063 | 8/1989 | Abonance | 280/809 |

FOREIGN PATENT DOCUMENTS 2829853 2/1979 Fed. Rep. of Germany ........ 36/122
0406946 8/1944 France .................................. 37/224

Primary Examiner—Charles A. Marmor
Assistant Examiner—Anne Marie Boehler
Attorney, Agent, or Firm—Cassidy, Vance & Tarleton

[57] ABSTRACT

A traction enhancement system (10) for a snowmobile (12) that includes a front plate member (14) and deflection plates (16) mounted ahead of the snowmobile body (18) for deflecting and compressing fresh, ungroomed snow to enhance traction, startability, and stability of the snowmobile in heavy and rough snow conditions. The front plate member (14) comprises an upper screen (40) offset ahead of a lower screen (42), with both screens being attached to the bumper (36) to angle downward toward the tail section (28) of the snowmobile (12). Each deflection plate (16) is bent along a longitudinal axis and mounted to the tip (32) of the skies (30) to deflect snow to either side of the skies (30). The front plate member (14) and the deflection plates (16) are slidably engaged within their respective receiving tubes (61) and (98), which are attached to the snowmobile (12) to facilitate quick and easy attachment and detachment.

5 Claims, 3 Drawing Sheets

TRACTION ENHANCEMENT SYSTEM

TECHNICAL FIELD

The present invention pertains to devices for improving traction in the snow, and, more particularly, to a traction enhancement system for a snowmobile that improves traction, stability, and startability in deep snow and other unusual conditions.

BACKGROUND OF THE INVENTION

Snowmobiles are a common means for traveling in or on snow. Typically, snowmobiles are small vehicles with ski-like runners in front used to steer the vehicle and tank-like treads in back for propelling the vehicle across the snow. To facilitate passage of the snowmobile through deep snow, groomed trails are frequently formed, especially in the back country and in restricted areas. However, continual use of these trails results in the snow becoming compacted and grooved, making passage more difficult and the ride uncomfortable. Consequently, snowmobile riders will attempt to ride off the trail in fresh snow. Furthermore, it sometimes becomes necessary to ride in fresh snow where no trails have been formed, such as immediately after or during a snowfall or to travel to a wilderness area.

One difficulty in riding in deep snow is that the snowmobile is capable of only traveling through snow of a certain depth. When fresh snow is more than a foot deep, traction is severely reduced, making it difficult to initiate movement and maintain stability.

Although there are a number of devices for grooming snowmobile trails, there does not exist any device that attaches to the front of the snowmobile for improving traction in heavy or deep snow. For instance, U.S. Pat. No. 3,884,498, issued to Cote, Jr., on May 20, 1975 discloses a snowmobile trail sweep that is essentially a precurved flap attached to the rear of the snowmobile to smooth the snow behind the vehicle as it travels over a trail. U.S. Pat. No. 4,057,916, issued to Roemer on Nov. 15, 1977, discloses a snowmobile trail leveler having a multi-blade rotating member positioned between a traction tread and a pair of forward-mounted skis for leveling bumps or raises in a snowmobile trail. Similarly, U.S. Pat. No. 4,127,949, issued to Sabrowsky et al. on Dec. 5, 1978, teaches an apparatus designed to break up a wavy and rutted snowmobile trail, including packed and icy snow, thus smoothing out an already existing trail. None of these references teaches or suggests attaching a device to the front of a snowmobile for deflecting and compressing snow ahead of a snowmobile.

SUMMARY OF THE INVENTION

The present invention is directed to a traction-enhancing system for a snowmobile. The system includes a snowmobile having a pair of forward-mounted skis with upwardly curving tips and a rear-mounted track. A first plate member is mounted between the pair of skis and forward of the snowmobile track for pushing and compressing snow. A pair of second plate members are each mounted on the tip of a single ski for deflecting and compressing snow ahead of the ski.

In accordance with another aspect of the present invention, the first plate member comprises a first plate and a second plate, with the first plate being positioned above and forward of the second plate. Ideally, the first and second plates are positioned at an angle such that they angle downward toward the rear of the snowmobile.

In accordance with yet another aspect of the present invention, the first and second plates and the pair of second plate members are all formed of metal mesh plate material. However, it is to be understood that other material of suitable strength and functionality may be used without departing from the spirit and scope of the invention.

In accordance with a further aspect of the present invention, each of the second plate members are bent along a longitudinal axis such that when mounted on the ski, snow is deflected laterally to either side of the ski.

As will be readily appreciated from the foregoing description, the present invention provides a traction enhancement system for a snowmobile that enables the snowmobile to travel in deep and fresh snow. Because the snow is deflected away from the front skis and compressed forward of the track, traction is improved and the startability of the snowmobile in deep snow and other unusual conditions is enhanced. In addition, stability is increased, thereby increasing safety for the rider and other riders in close proximity. Furthermore, all of the plates are easily attached and detached from the snowmobile. The system also provides stability in different types of terrain, for example, while traversing side hills, traveling up or down hills, and while making turns. The present system is not designed for and has no use on pre-existing trails. If this type of travel is desired, the rider can easily and quickly detach the plates from the brackets, although preferably they will remain in place.

BRIEF DESCRIPTION OF THE DRAWINGS

The foregoing and other features and advantages of the present invention will be more readily appreciated as the same becomes better understood from the following detailed description when taken in conjunction with the drawings, wherein.

DETAILED DESCRIPTION OF THE PREFERRED EMBODIMENT

Figure 1:
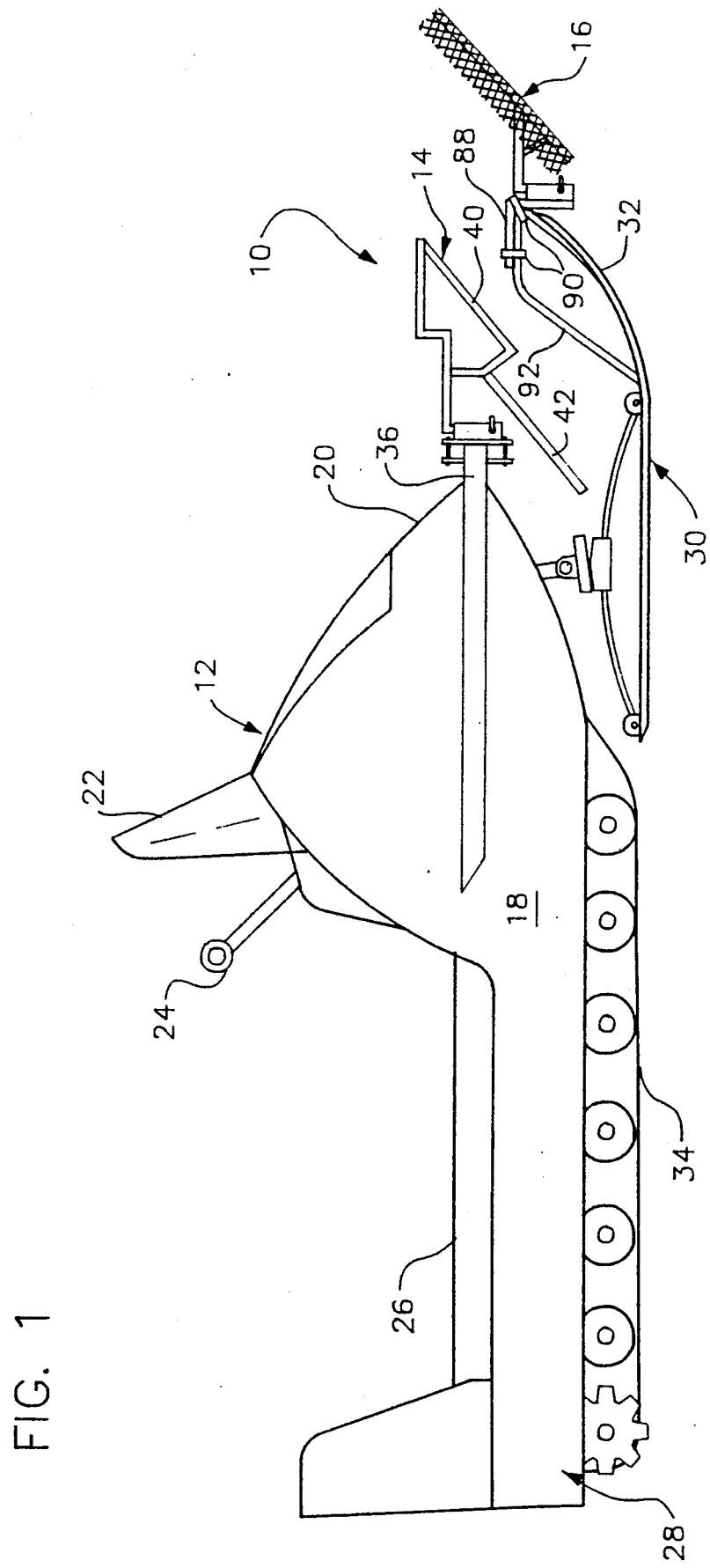
FIG. 1 is a side view of the traction enhancement system formed in accordance with the present invention.

The representative embodiment illustrated in FIG. 1 is directed to a traction enhancement system 10 comprising a snowmobile 12, a front plate member 14, and a pair of forward-mounted deflection plates 16. With respect to the snowmobile 12, since these vehicles are readily commercially available, it will not be described in detail herein. Briefly, the snowmobile 12 includes a body 18 having a nose cone 20, windshield 22, handlebars 24, a seat 26, and a tail section 28. The snowmobile 12 is supported above the snow by a pair of spaced-apart parallel skis 30 having upwardly curved tips 32. The drive means typically consists of a gasoline powered engine (not shown) that drives a track 34 mounted under the seat 26 and tail section 28. A bumper 36 is mounted on the leading edge of the nose cone 20.

Most snowmobiles are designed to operate on groomed trails or in shallow freshly-fallen snow. Operating a snowmobile in deep snow off of a groomed trail is unsafe because the track 34 has difficulty achieving traction and the forward skis 30 do not provide enough stability, especially while traversing the side of a hill, traveling up or down a hill, and while making turns. The traction enhancement system 10 formed in accordance with the present invention overcomes these disadvantages and permits operation of the snowmobile 12 in snow of substantial depths. The present invention accomplishes this by having a front plate member 14 mounted ahead of the snowmobile body 18 and a pair of deflection plates 16 mounted on the tips 32 ahead of the skis 30 to deflect the snow and compress it, thus forming a rough trail over which the snowmobile 12 can then be ridden.

Figure 2:
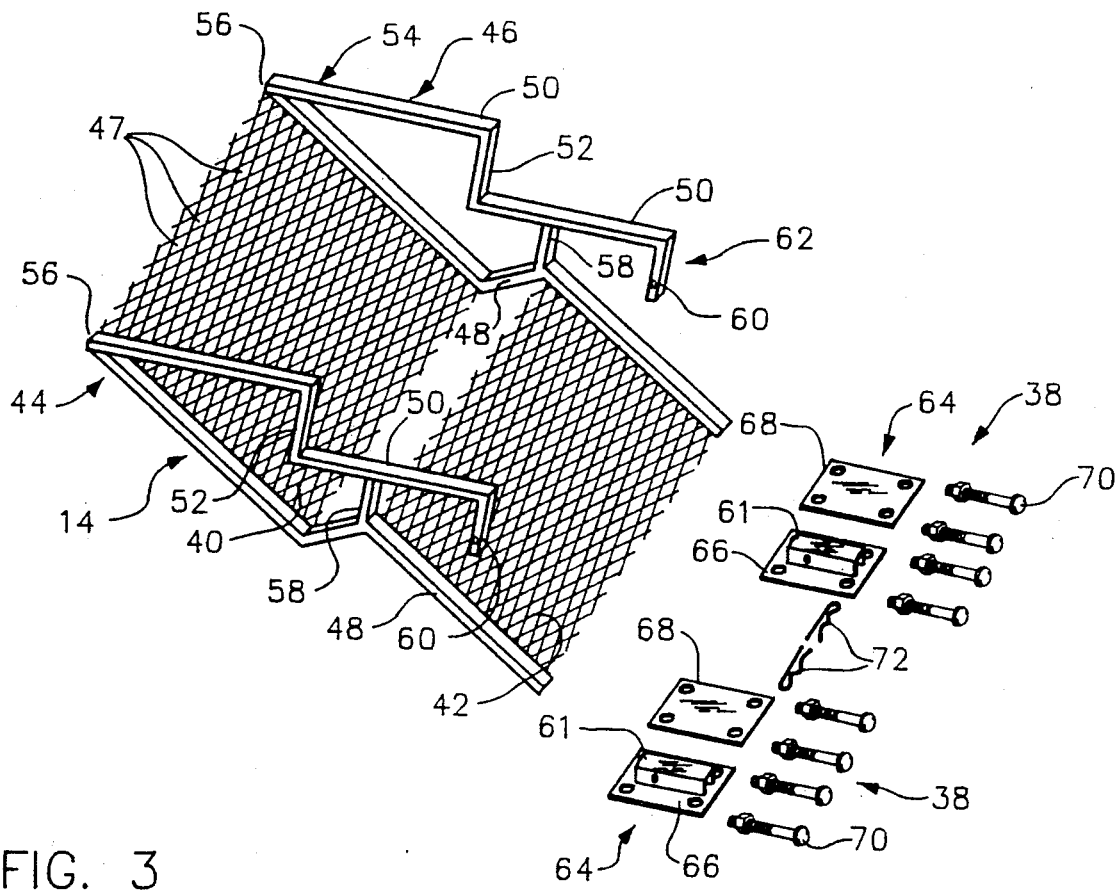
FIG. 2 is an isometric view of the disassembled front plate assembly.
Figure 3:
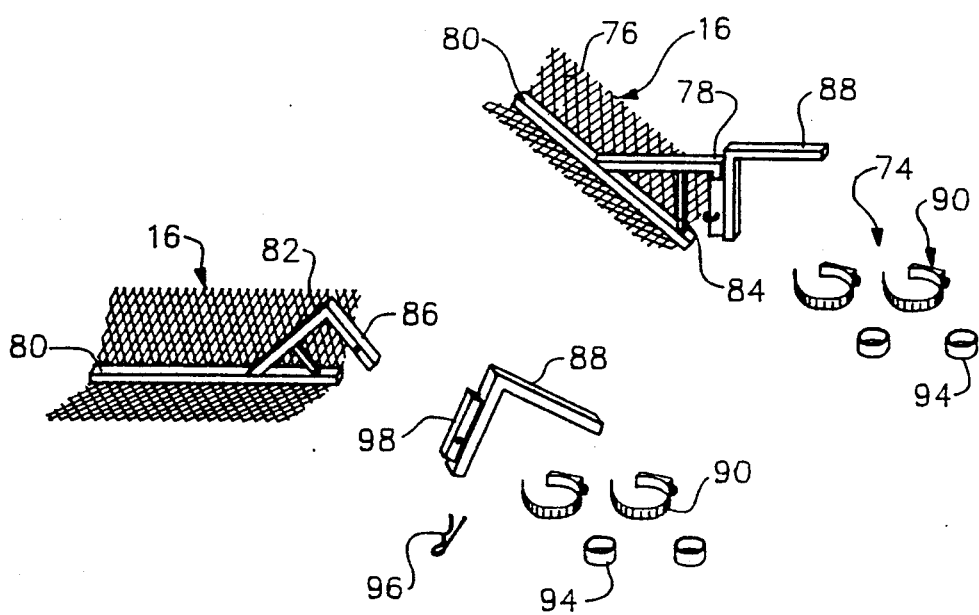
FIG. 3 is an isometric view of the disassembled deflection plate assembly.

As shown more clearly in FIGS. 2 and 3, the traction enhancement system 10 comprises two main components, the front plate member 14, illustrated in disassembled form in FIG. 2, and a pair of deflection plates 16, illustrated in disassembled form in FIG. 3. Referring to FIG. 2, the front plate member 14 is shown along with the attachment hardware 38. The front plate member 14 is comprised of two offset mesh screens, an upper screen 40 and a lower screen 42. Both screens 40 and 42 are attached to a left frame member 44 and a right frame member 46. Ideally the upper and lower screens 40 and 42 are formed of wire mesh material having openings 47 therein. Both screens 40 and 42 are of the same size, being approximately 11 inches high and 17 inches long. The left and right frame members 44 and 46 are formed of box tube iron or other suitable metal material such that the upper and lower screens 40 and 42 can be attached thereto by welding or other suitable method. When the upper screen 40 is so attached to the frame members 44 and 46, it will be offset several inches forward of the lower screen 42. Furthermore, the left and right frame members 44 and 46 are so formed that both screens 40 and 42 will angle downward toward the tail section 28 of the snowmobile 12 when the front plate member 14 is attached to the snowmobile 12.

The left and right frame members 44 and 46 have lower angled rails 48 and a pair of upper horizontal rails 50 that are offset by a vertical rail 52. The forward portion 54 of the upper horizontal rails 50 is attached to the lower angled rails 48 at its forward most point 56 and a vertical support rail 58 attaches the upper horizontal rails 50 to the lower angled rails 48 at the approximate midpoint. A vertical attachment rail 60 depends downward from the rearward end of the upper horizontal rails 50 to form an attachment point.

The attachment hardware 38 includes a pair of attachment plates 64 for each frame member 44 and 46, comprising a front attachment plate 66 and a rear attachment plate 68. Four bolts 70 are used to attach each pair of plates 64 to the bumper 36 of the snowmobile 12. A retaining pin 72 is used to hold the vertical attachment rail 60 in engagement with the front attachment plate 66, as will be described more fully below.

The deflection plates 16 and their attachment hardware 74 will now be described in more detail in conjunction with FIG. 3. As illustrated therein, each deflection plate 16 is formed of metal mesh material having openings 76 formed therein. Each deflection plate 16 has an approximate rectangular shape and is bent along its longitudinal axis at an angle that is preferrably between 75 and 90 degrees. A single frame member 78 is attached to each deflection plate 16 along the longitudinal axis. The frame member 78 includes a longitudinal rail 80 that is attached to the deflection plate 16 and a corner rail 82 that is attached to the longitudinal rail at an angle such that when the frame member 78 is attached to the tip 32 of the ski 30, the deflection plate 16 will be angled downward toward the tail section 28 of the snowmobile 12. A brace rail 84 is also attached to the longitudinal rail 80 and the corner rail 82 for reinforcement. The free leg 86 of the corner rail 82 is used to attach the deflection plates 16 to the snowmobile 12.

Also illustrated in FIG. 3 is the attachment hardware 74 that includes a corner bracket 88 and a pair of clamps 90 used to attach the corner bracket 88 to a mounting rail 92 (shown more clearly in FIG. 1) that is attached to the tip 32 of the ski 30. A pair of resilient cushions 94 prevent scratching of the brackets 88 and rails 92 by the clamps 90. The retaining pins 96 maintain the free leg 86 in engagement with the corner bracket 88, as will be described in more detail below. Each corner bracket 88 further includes a receiving tube 98 formed on one leg thereof to slidably receive the free leg 86 of the frame member 78.

Figure 4:
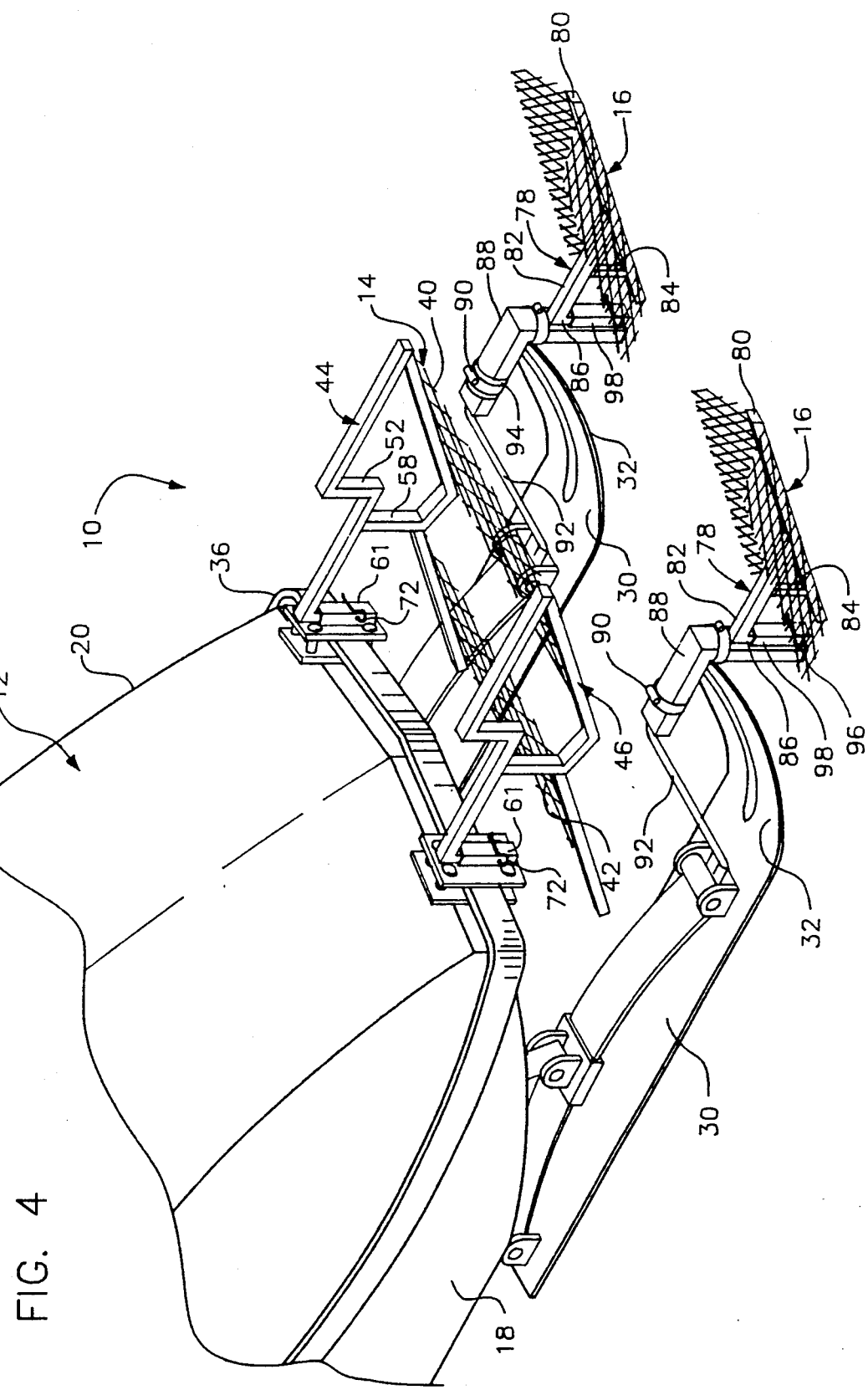
FIG. 4 is an isometric view of the traction enhancement system of the present invention.

Referring next to FIG. 4, the construction and operation of the traction enhancement system 10 will now be described. For the attachment of the front plate member 14, the rear attachment plate 68 is placed behind the bumper 36 and the front attachment plate 66 is aligned in front of the rear attachment plate 68 on the front side of the bumper 36. The four bolts 70 are inserted through holes in the attachment plates to urge them together to grip the bumper 36. Next, the front plate member 14 is brought to a position where the vertical attachment rails 60 are aligned with a receiving tube 61 that is formed on the front attachment plates 66. The vertical attachment rail 60 is then slidably engaged within the receiving tube 61 and retained in position by inserting the retaining pin 72 through openings in the receiving tube 61 and the vertical attachment rail 60. The front plate member 14 is easily removed by pulling out the retaining pins 72 and lifting the vertical attachment rails 60 out of the receiving tubes 61. Preferably the attachment plates 64 remain in position on the bumper to facilitate quick and easy attachment and removal of the front plate member 14.

The deflection plates 16 are similarly mounted to the skis 30. First, the corner brackets 88 are attached to the mounting rails 92 on the ski tip 32 as illustrated, with the receiving tube 98 being vertically oriented. The resilient cushions 94 are wrapped around the mounting bracket 92 and the corner bracket 88, and then the clamps 90 are placed around the resilient cushions 94 and tightened. Each deflection plate 16 is brought to the respective corner bracket 88 and the free leg 86 is slidably engaged within the receiving tube 98 on each corner bracket 88. The deflection plates 16 are retained within the receiving tube 98 by sliding the retaining clips 96 through openings in the receiving tube 98 and the free leg 86. As with the front plate member 14, the deflection plates 16 may be easily and quickly removed by pulling out the retaining clips 96 and lifting the free legs 86 clear of the receiving tubes 98. Preferably the corner brackets 88 will remain attached to the mounting brackets 92 on the ski tips 32 to facilitate quick and easy attachment and removal of the deflection plates 16.

In operation, the upper and lower screens 40 and 42 and the deflection plates 16 contact snow as the snowmobile 12 is propelled forward by the track 34 such that the snow will be deflected downward and compressed by the front plate member 14 and deflected to either side of the skis 30 by the deflection plates 16. With this traction enhancement system 10, a rough trail is pre-groomed in the snow ahead of the snowmobile 12 to enable the track 34 to start the snowmobile 12 moving and enhance traction. In addition, the deflection plates 16 allow the skis to stabilize the snowmobile 12, especially on hills and when making turns.

While a preferred embodiment has been illustrated and described, it is to be understood that various changes may be made therein without departing from the spirit and scope of the invention. For instance, the upper and lower screens 40 and 42 and the deflection plates 16 may be formed of material other than metal mesh screens, such as very strong lattice woodwork or a composite plastic. Furthermore, it is contemplated that the mounting angle of the front plate member 14 and the deflection plate 16 can be mechanically varied by a rider as the snowmobile 12 is being driven across the snow to achieve the best traction and stability under different conditions. Thus, the scope of the invention is to be limited only by the claims that follow.

The embodiments of the invention to which an exclusive property or privilege is claimed are defined as follows:

1. A traction enhancement system for a snowmobile, the snowmobile having a pair of spaced-apart forwardly-mounted skis, each ski having an upwardly-curving tip, and a rearwardly mounted track, the system comprising:
    a first mesh plate member mounted between the pair of skis and forward of the snowmobile track for compressing snow, said first mesh plate member including a first mesh plate and a second mesh plate, said first mesh plate being positioned above and forward of said second mesh plate; and
    a pair of second mesh plate members, each of said second plate members being mounted on and above the tip of a single ski for deflecting snow, each of said second mesh plate members are mounted on the ski tip to be positioned forward of the ski, said second mesh plate members are bent along a longitudinal axis such that when mounted on the ski, snow will be deflected laterally to either side of the ski.

2. The system of claim 1, wherein said first and second mesh plates are positioned above the pair of skis and at an angle relative to the pair of skis to angle downward toward the rear of the snowmobile.

3. The system of claim 2, wherein each of said second mesh plate members is formed of a metal mesh plate material.

4. A traction enhancement system for improving traction, stability, and startability in deep snow, the system comprising:
    a snowmobile, said snowmobile having a pair of spaced-apart forwardly-mounted skis, each ski having an upwardly-curving tip, and a rearwardly mounted track;
    a first mesh plate member mounted between said pair of skis and above and forward of said snowmobile track for compressing snow, said first mesh plate member comprises a first mesh plate and a second mesh plate, said first mesh plate being positioned above and forward of said second mesh plate; and
    a pair of second mesh plate members, each of said second mesh plate members being mounted on and above said tip of a single ski for deflecting snow, each of said second mesh plate members are mounted on said ski tip to be positioned forward of said ski, each of said second mesh plate members are bent along a longitudinal axis such that when mounted on said ski, snow is deflected laterally to either side of said ski.

5. The system of claim 4, wherein said first and second mesh plates are positioned at an angle relative to said pair of skis to angle downward toward the rear of said snowmobile.

* * * * *